United States Patent
Lee

(10) Patent No.: US 10,574,659 B2
(45) Date of Patent: Feb. 25, 2020

(54) NETWORK SECURITY MANAGEMENT SYSTEM

(71) Applicant: SOFNET CORPORATION, Taipei (TW)

(72) Inventor: Kun-Jung Lee, Taipei (TW)

(73) Assignee: SOFNET CORPORATION, Taipei (TW)

( * ) Notice: Subject to any disclaimer, the term of this patent is extended or adjusted under 35 U.S.C. 154(b) by 282 days.

(21) Appl. No.: 15/870,937

(22) Filed: Jan. 13, 2018

(65) Prior Publication Data

US 2019/0098011 A1    Mar. 28, 2019

(30) Foreign Application Priority Data

Sep. 22, 2017   (TW) ................................ 106132502

(51) Int. Cl.
*H04L 29/06* (2006.01)
*H04L 12/24* (2006.01)

(52) U.S. Cl.
CPC ............ *H04L 63/101* (2013.01); *H04L 41/18* (2013.01); *H04L 41/28* (2013.01); *H04L 63/105* (2013.01); *H04L 63/20* (2013.01)

(58) Field of Classification Search
CPC ....... H04L 63/101; H04L 41/18; H04L 41/28; H04L 63/20; H04L 63/105
See application file for complete search history.

(56) References Cited

U.S. PATENT DOCUMENTS

| | | | | |
|---|---|---|---|---|
| 9,596,233 B1* | 3/2017 | Mehta | ...................... | G06F 16/24 |
| 9,942,224 B2* | 4/2018 | Mehta | ...................... | G06F 16/24 |
| 10,447,745 B2* | 10/2019 | Vuong | .................... | H04L 67/12 |
| 2014/0366120 A1* | 12/2014 | Wood | ...................... | H04L 63/10 |
| | | | | 726/15 |
| 2017/0230432 A1* | 8/2017 | Vuong | .................... | H04L 51/32 |
| 2017/0250980 A1* | 8/2017 | Mehta | ..................... | G06F 16/24 |

\* cited by examiner

*Primary Examiner* — Teshome Hailu
(74) *Attorney, Agent, or Firm* — Maschoff Brennan

(57) ABSTRACT

A network security management system which manages an object node belonging to an intranet, including: an information collecting device, a type determining device and an event management device; the information collecting device being configured to collect domain information, computer name information and account information of each object node which is transmitted when each object node performs a login operation; the type determining device being configured to perform a comparison between the node information received by the information collection device and a node management list to determine a node type belonging to each object node; the event management device being configured to decide whether the object node has an operating privilege, or to give to the object node the operating privilege corresponding to the node type of the object node based on the compared result from the type determining device.

14 Claims, 7 Drawing Sheets

| Index Number | Node Type | Permission Domain | Permission Computer Name | Permission Account |
|---|---|---|---|---|
| 1 | Common Computer | A | P1 | |
| 2 | Common Computer | B | P3 | |
| 3 | Common Account | A | | Guest1 |
| 4 | Common Account | B | | Guest2 |
| 5 | Binding Computer And Account | A | P2 | Lee |
| 6 | Binding Computer And Account | B | P4 | Gigi |
| 7 | Object Node Local Login Permission | | P5 | |

FIG.3

NETWORK SECURITY MANAGEMENT SYSTEM

FIELD OF THE INVENTION

The present invention relates to a network security management system, and more particularly relates to a network security management system in an intranet.

BACKGROUND OF THE INVENTION

With the progress of network and digital information technology, an intranet has been an effective communication link among all members and departments in an enterprise organization to exchange important information or documents among members. However, data exchange in the intranet results in a lot of risks, such as: data stealing and virus spreading. As a result, enterprise must establish multiple security management systems in network environment, such as a firewall or an antivirus program, to avoid intentional data stealing or virus spreading. However, some loopholes still exist in the security management systems in the prior art, which is inevitable to cause information leakage due to the improper human operation, intentional data stealing or hacker attack in the intranet.

Therefore, enterprises usually establish additional internal security management system that manages the tasks of computers by distributed and complicated manual operation to verify information through complicated verifying operation. However, this type of security system lacks integrate ability to effectively detect the problematic nodes. That causes, when the security management system found a computer anomalous, the problem has happened for a period of time such that the position of the abnormal computer is unable to be quickly found by the late analysis to the statuses of computers in each sections. Furthermore, in terms of information management, the manager of the security management system is required to manually configure the privilege for all kinds of documents according to the content of document, which will cause an unexpected delay if the manager fails to timely configure the privilege because of enormous amount of secret document. Therefore, the prior internal security management systems are found with a plenty of flaws needed to be improved.

SUMMARY OF THE INVENTION

Therefore, an objective of the present invention is to provide a network security management system which can effectively integrate internal nodes and immediately assign privilege to nodes so as to achieve the goal of excellent performance, time-saving and safety.

In order to achieve the above, the present invention provides a network security management system which manages an object node belonging to an intranet, the network security management system comprising: an information collecting device configured to collect node information of each object node which is transmitted when each object node performs a login operation, the node information including domain information, computer name information and account information; a type determining device which is in signal connection with the information collecting device, the type determining device being configured to perform a comparison between the node information received by the information collection device and a node management list to determine a node type belonging to each object node that performs the login operation in the network security management system, wherein the node management list is with permission domain information, permission computer name information and permission account information respectively corresponding to each node type, and the comparison between the node information and the node management list is performed by respectively comparing the node information to the permission domain information, the node information to the permission computer name information and the node information to the permission account information to obtain a compared result so as to determine the node type of the object node as the node type of the object node is found in the node management list, or to determine the object node of the object is not in the node management list as the object node is not found with any corresponding node type in the node management list; and an event management device which is in signal connection with the type determining device, the event management device being configured to determine a login event of the object node based on the compared result from the type determining device so as to perform a corresponding management operation to the object node, wherein the management operation includes an operation to decide whether the object node has an operating privilege, or to give to the object node the operating privilege corresponding to the node type of the object node.

In one embodiment of the present invention, a network security management system is provided that the node type including an object node local login permission type whose corresponding permission domain information and the corresponding permission account information are recorded as a null information, wherein the type determining device performs a comparison regarding the permission domain information and then performs a comparison regarding the permission computer name information of the object node local login permission type when the comparison regarding the permission domain information is not found matched such that when the comparison regarding the permission computer name information of the object node local login permission type is found matched, the object node is determined as performing login with a node type belonging to the object node local login permission type in the node management list, and accordingly the event management device determines the login of the object node as an in-list login event of the object node local login permission type.

In one embodiment of the present invention, a network security management system is provided that when the comparison regarding the permission computer name information of the object node local login permission type is not found matched, the object node is determined as performing login with a node type belonging to the object node local login non-permission type in the node management list, and accordingly the event management device determines the login of the object node as an in-list login event of the object node local login non-permission type.

In one embodiment of the present invention, a network security management system is provided that the node type including a common account type whose corresponding permission computer name information is recorded as null information, wherein the type determining device performs a comparison respectively regarding the permission domain information, the permission computer name information and the permission account information and then further performs a comparison regarding the permission account information of the common account type when the comparison regarding the permission domain information is found matched, the comparison regarding the permission computer name information is found unmatched, and the comparison regarding the permission account information is found matched such that when the comparison regarding the permission account information of the common account type is found matched, the object node is determined as performing login with a node type belonging to the common account type in the node management list, and accordingly the event management device determines the login of the object node as an in-list login event of the common account type.

In one embodiment of the present invention, a network security management system is provided that when the comparison regarding the permission domain information is found matched, the comparison regarding the permission computer name information is not found matched and the comparison regarding the permission account information is not found matched, the object node is determined as performing login with a node type belonging to a non-management list which is not in the node management list, and accordingly the event management device determines the login of the object node as a not-in-list login event of the non-management list.

In one embodiment of the present invention, a network security management system is provided that when the comparison regarding the permission account information of the common account type is not found matched, the object node is determined as performing login with a node type belonging to a non-specified computer type which is not in the node management list, and accordingly the event management device determines the login of the object node as a not-in-list login event of the non-designated computer type.

In one embodiment of the present invention, a network security management system is provided that the type determining device performs a comparison respectively regarding the permission domain information and the permission computer name information and then performs a comparison regarding the permission account information of the binding computer and account type when the comparison regarding the permission domain information is found matched and the comparison regarding the permission computer name information is found matched such that when the comparison regarding the permission account information of the binding computer and account type is found matched, the object node is determined as performing login with a node type belonging to the binding computer and account type in the node management list, and accordingly the event management device determines the login of the object node as an in-list login event of the binding computer and account type.

In one embodiment of the present invention, a network security management system is provided that the node type including a common computer type whose corresponding permission account information is recorded as a null information, wherein the type determining device further performs a comparison regarding the permission computer name information of the common computer type when the comparison regarding the permission account information of the binding computer and account type is not found matched such that when the comparison regarding the permission computer name information of the common computer type is found matched, the object node is determined as performing login with a node type belonging to the common computer type in the node management list, and accordingly the event management device determines the login of the object node as an in-list login event of the common computer type.

In one embodiment of the present invention, a network security management system is provided that when the comparison regarding the permission computer name information of the common computer type is not found matched, the object node is determined as performing login with a node type belonging to a non-specified account type which is not in the node management list, and accordingly the event management device determines the login of the object node as a not-in-list login event of the non-specified account type.

In one embodiment of the present invention, a network security management system is provided further comprising an on-line monitoring device which is in signal connection with the event management device, the on-line monitoring device being configured to determine whether an object node which has been previously determined as not being in the list and which is found on-lined in the intranet is being in an operation to force to log in to the network security management system, and when the object node is determined as not being in an operation to force to log in to the network security management system, the event management device determines that the object node is a valid on-line event which is not within the management range, and informs the object node to perform a management operation of installing agent program.

In one embodiment of the present invention, a network security management system is provided that when the object node is determined as being in an operation to force to log in to the network security management system the on-line monitoring device is configured to further confirm whether the node information of the object node is collected by the information collection device within a predetermined time limit such that when the object node is determined as being in an operation not to force to log in to the network security management system, the event management device determines that the object node is an non-added-in-management-system event which is not in the management range.

In one embodiment of the present invention, a network security management system is provided further comprising a periodically confirming device which is in signal connection with the event management device, the periodically confirming device being configured to confirm whether the object node in the list has periodically reported a node message, and the event management device further includes a periodically reporting event management module which is configured, when the periodically confirming device has confirmed that the object node being failed to periodically report the node message, to determine the event as a computer non-response event which is not in the management range.

In one embodiment of the present invention, a network security management system is provided that the periodically reporting event management module is configured, when a computer non-response event is determined, to perform a management regulation inquiry on the object node, and further determine, when the result of the management regulation inquiry is an authorized verification error or a domain name mismatch, the event as a domain disengaging event which is not in the management range.

In one embodiment of the present invention, a network security management system is provided that when the result of the management regulation inquiry is not an authorized verification error or a domain name mismatch, the periodically reporting event management module further performs a management regulation inquiry to determine whether the object node has not yet installed an agent program such that when the object node is determined as not yet installed the agent program, the event is determined as a not-yet-installed-agent-program event which is not in the management range, while when the object node is determined as having been installed the agent program, the event is determined as a computer-no-reply event which is not in the management range.

In one embodiment of the present invention, a network security management system is provided further comprising a computer identifying device which is in signal connection with the event management device, the computer identifying device being configured to inquiry the object node in the node management list by a management regulation to obtain a universally unique identifier data of the object node and to save a computer identifying information on a basis of the universally unique identifier data thereby comparing the computer identifying information with the previously saved computer identifying information such that when the compared result is found unmatched, the event management device determines the event as an anomalous computer fake event.

By means of the technology used by the present invention, in the intranet of enterprise where multiple domains exist, once a node computer boots a login operation to an operating system, the system of the present invention can quickly employ the information collecting device to collect node information of the object node, and employ the type determining device to perform a comparison between the login information and the node management list that has been built so as to quickly identify whether the login action of the object node is found matched to the node management list so as to achieve the goal of easy control to the network nodes. Moreover, the type determining device has performed a classification for the object nodes which were found matched to the node management list such that the event management device can quickly determine the login event according to the corresponding node types of the object nodes so as to assign the corresponding user privilege for the event. The user privileges, for example, include: a privilege limited to specific permitted computers not within the domain, a privilege limited to specific users, a privilege limited to specific computers, and a privilege limited to specific computer together with specific user. In one embodiment, an object node found not matched to the node management list can be directly blocked by the event management device so as to bring out the effects that the internal network environment is quickly integrated and information protection is secured.

Furthermore, the present invention employs the type determining device to perform a classification for the object nodes which are found not matched to the node management list, and employs the event management device to determine login event such that the manager can directly find out the anomalous problem according to the corresponding login events, including, for example: a not-in-list event of using non-specified computer and a not-in-list event of using non-specified account. Accordingly, the management is achieved without complicated analysis.

In addition, the present invention can perform a detailed classification for the object nodes such that the object of flexible and diverse management can be achieved.

Besides, the present invention further includes the on-line monitoring device to perform event determination for the object node not being in the list and inform the object node to install the agent program so as to be added into the management of the system. The present invention further employs the event management device to control the privilege of the object node based on the event so as to ensure the network security.

Also, the present invention further includes the periodically confirming device to periodically confirm whether the object node in the list which has been granted a privilege has periodically reported. And the periodically confirming device is able to detect whether the network connection of the object node is normal, and is able to further determine whether the anomalous status is an event of computer non-response or an event of domain privately disengagement, thereby strengthening the management of network security management system to solve one important pain point that the manager is difficult to clarify problem in network security management.

It is noted that the present invention further employs the computer identifying device to obtain the information of the object node by the management regulation inquiry, and to form an unique computer identifying information from the information of the object node. The formed unique computer identifying information is saved and is used to identify whether the computer hardware of the object node has been changed manually. Once the identifying result is anomalous, the event is determined as an anomalous computer fake event so as to inform the manager to perform real-time supervision, thereby ensuring that the computer hardware is not changed manually and the object of security management is achieved.

BRIEF DESCRIPTION OF THE DRAWINGS

FIG. 3 is a schematic table illustrating the node management list of the network security management system according to the embodiment of the present invention.

DETAILED DESCRIPTION OF THE PREFERRED EMBODIMENTS

The preferred embodiments of the present invention are described in detail below with reference to FIG. 1 to FIG. 7. The description is used for explaining the embodiments of the present invention only, but not for limiting the scope of the claims.

An example provided by the present invention is an integrated service of domains operated on a Windows Server The integrated service mainly manages resources like "people, apparatuses", etc. and forms network environment relationship, such as enterprise organization, department and meeting room. The Windows Server offers multiple services. The file service or printer service is only one of the services that has been integrated.

Figure 1:
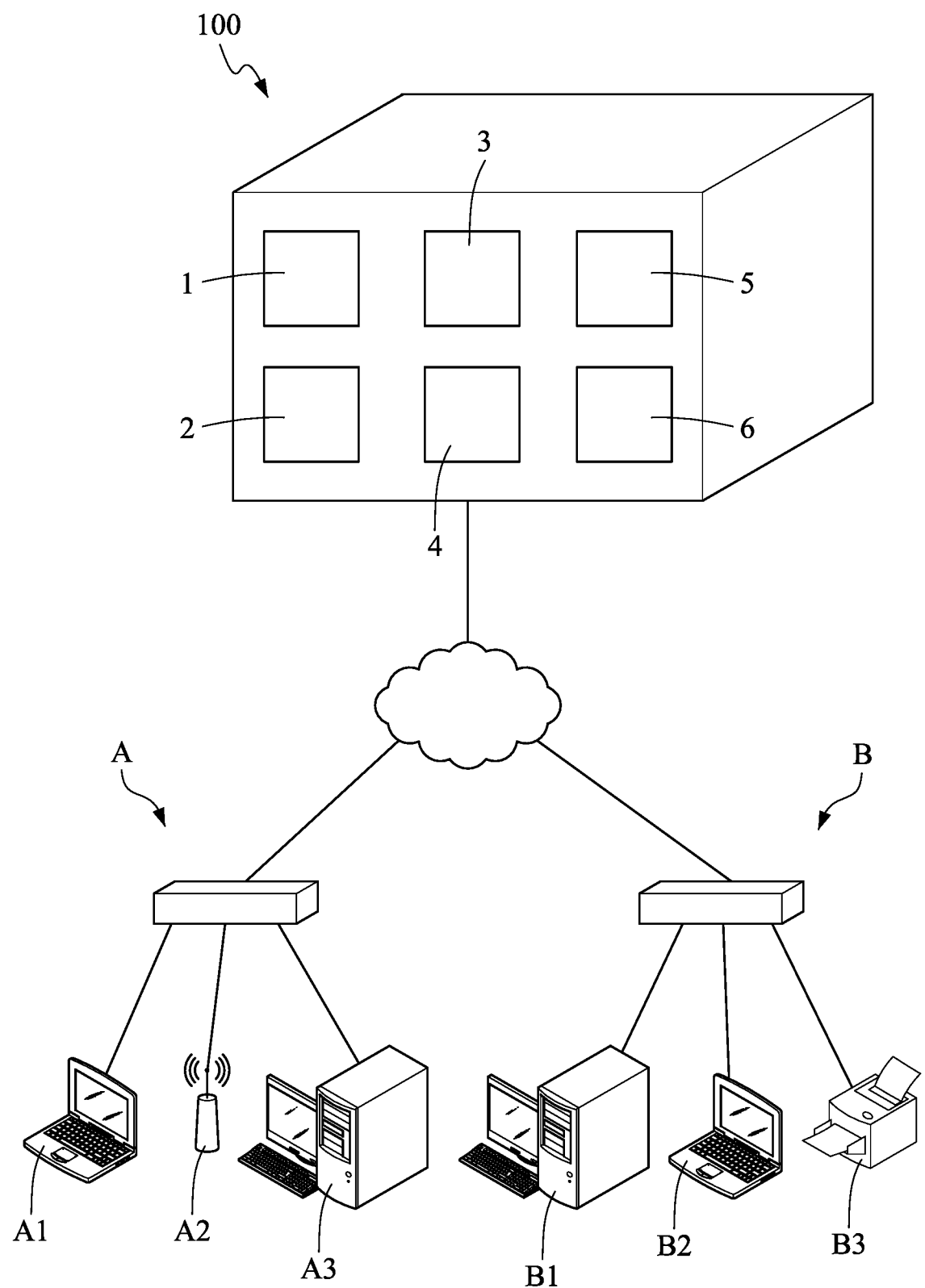
FIG. 1 is a schematic view illustrating a network security management system according to one embodiment of the present invention.

As shown in FIG. 1, a network security management system 100 according to one embodiment of the present invention performs the management for the object nodes (A1, A2, A3, B1, B2, B3) belonging to an intranet comprising domain A, domain B. The network security management system 100 includes: an information collecting device 1, a type determining device 2 and an event management device 3.

Figure 2:
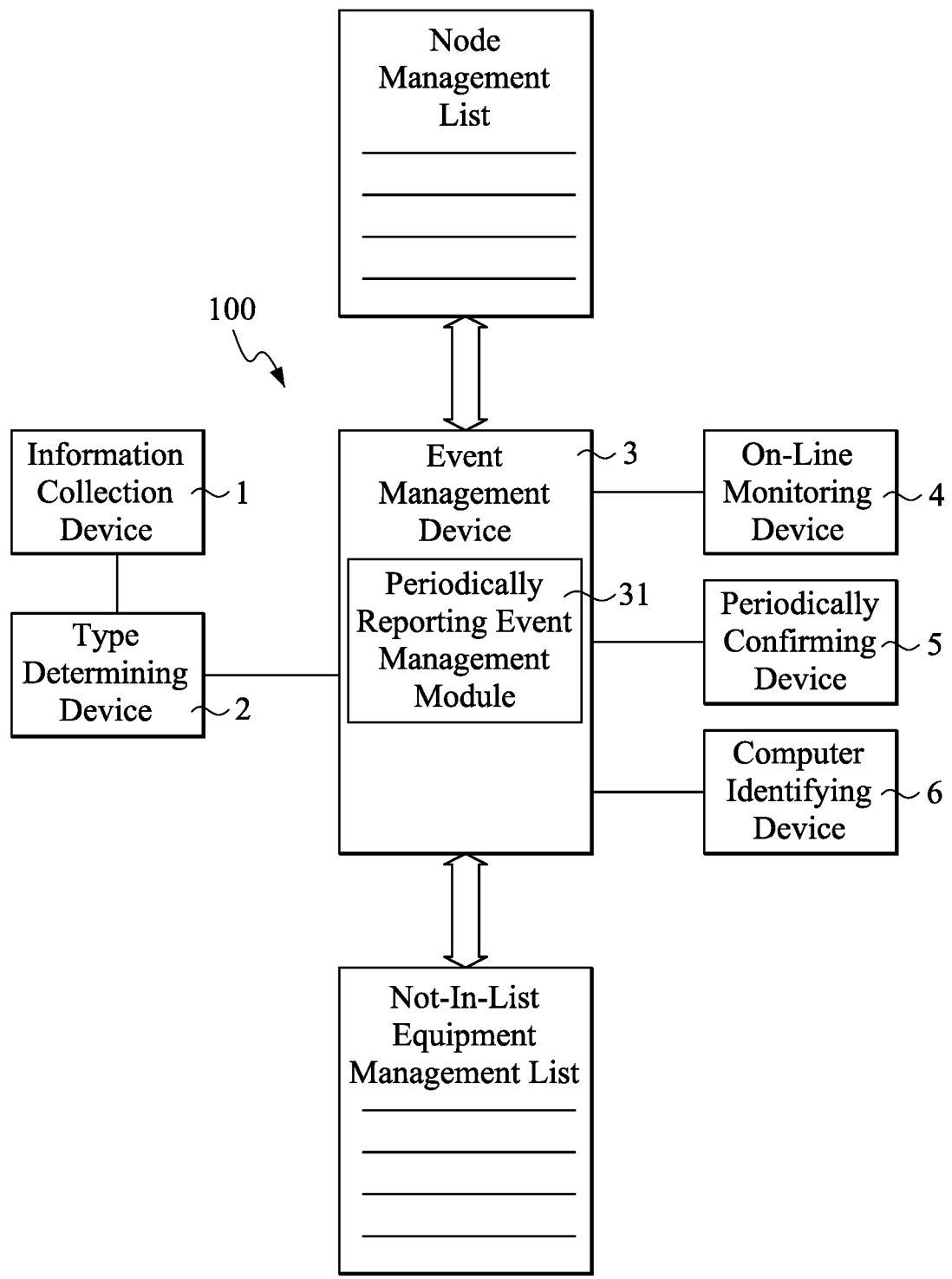
FIG. 2 is a system block schematic view illustrating the network security management system according to the embodiment of the present invention.

For example, the network security management system 100 as shown in FIG. 1 and FIG. 2 is installed in a master console which is built inside the enterprise. The event management device 3 in the embodiment of the present invention is served as a coordinating manager and is connected with all devices of this system, including the information collecting device 1, the type determining device 2, an on-line monitoring device 4, a periodically confirming device 5, and a computer identifying device 6. The intranet managed by the network security management system 100 includes a domain A and a domain B. Moreover, the domain A includes the object nodes A1, A2, A3; the domain B includes the object nodes B1, B2, B3.

In this embodiment, the network security management system 100 deploys an Active Directory (AD) environment by means of a Microsoft system and delivers software by means of Group Policy Object (GPO) so as to install an agent program to the object nodes (A1, A2, A3, B1, B2, B3).

The information collecting device 1 collects node information of all object nodes (A1, A2, A3, B1, B2, B3), which is transmitted when each object node performs a login operation. The node information includes domain information, computer name information and account information. In this embodiment, the information collecting device 1 collects node information of all object nodes (A1, A2, A3, B1, B2, B3), which is transmitted when the agent program of each object node performs a login operation to login the AD environment. The node information includes: login domain, computer name, login account, and additionally includes IP address, MAC address, etc.

As shown in FIG. 1 and FIG. 2, the type determining device 2 is in signal connection with the information collecting device 1. The type determining device 2 is configured to perform a comparison between the node information received by the information collection device 1 and a node management list to determine a node type belonging to all object nodes (A1, A2, A3, B1, B2, B3) that performs the login operation in the network security management system; or to determine the object node is not in the node management list, and to further determine a not-in-list type. Moreover, the type determining device 2 transmits the login compared result of the node information to the event management device 3.

The event management device 3 is in signal connection with the type determining device 2. The event management device 3 is configured to determine an in-list login event or a not-in-list login event of the node type belonging to the object nodes (A1, A2, A3, B1, B2, B3) based on the compared result from the type determining device 2. Moreover, The event management device 3 gives login system permission and specified management operating privilege to the object nodes (A1, A2, A3, B1, B2, B3) which are in list based on the node type belonging thereto. The event management device 3 can also determine whether each of the not-in-list object nodes (A1, A2, A3, B1, B2, B3) has operating privilege based on the node type, and block the login for the type with high risk to prevent from connecting to the system, or block directly all the not-in-list object nodes (A1, A2, A3, B1, B2, B3).

As shown in FIG. 3, for example, the node management list is accessible in this system, and in this embodiment is accessible in the event management device 3. The node management list is a list. The content of the node management list is shown by columns named: index number, node type and condition with permission domain information, permission computer name information and permission account information corresponding to the node type.

The node type is one type selected from four types including an object node local login permission type, a common account type, a binding computer and account type and a common computer type. The permission domain information, the permission computer name information and the permission account information can be recorded as a null information, meaning that it is not necessary that the information has a corresponding condition, in other words, the information comparison regarding the information can be ignored without being performed. The object node local login permission type is with the corresponding permission domain information and the corresponding permission account information which are recorded as null information; the common account type is with the corresponding permission computer name information which is recorded as null information; the binding computer and account type is without any information which is recorded as null information; the common computer type is with the corresponding permission account information which is recorded as null information.

The type determining device 2 respectively performs the comparison between the domain information, the computer name information and the account information of the node information and the permission domain information, the permission computer name information and the permission account information of the node management list. Then, the type determining device 2 respectively determines the node type of each of the object nodes (A1, A2, A3, B1, B2, B3) based on the compared result as the node type of the object nodes (A1, A2, A3, B1, B2, B3), which are found in the node management list, or the type determining device 2 determines the object nodes (A1, A2, A3, B1, B2, B3), which are not in the node management list as the object nodes (A1, A2, A3, B1, B2, B3) are not found with any corresponding node type in the node management list and further determines the not-in-list type.

Figure 4:
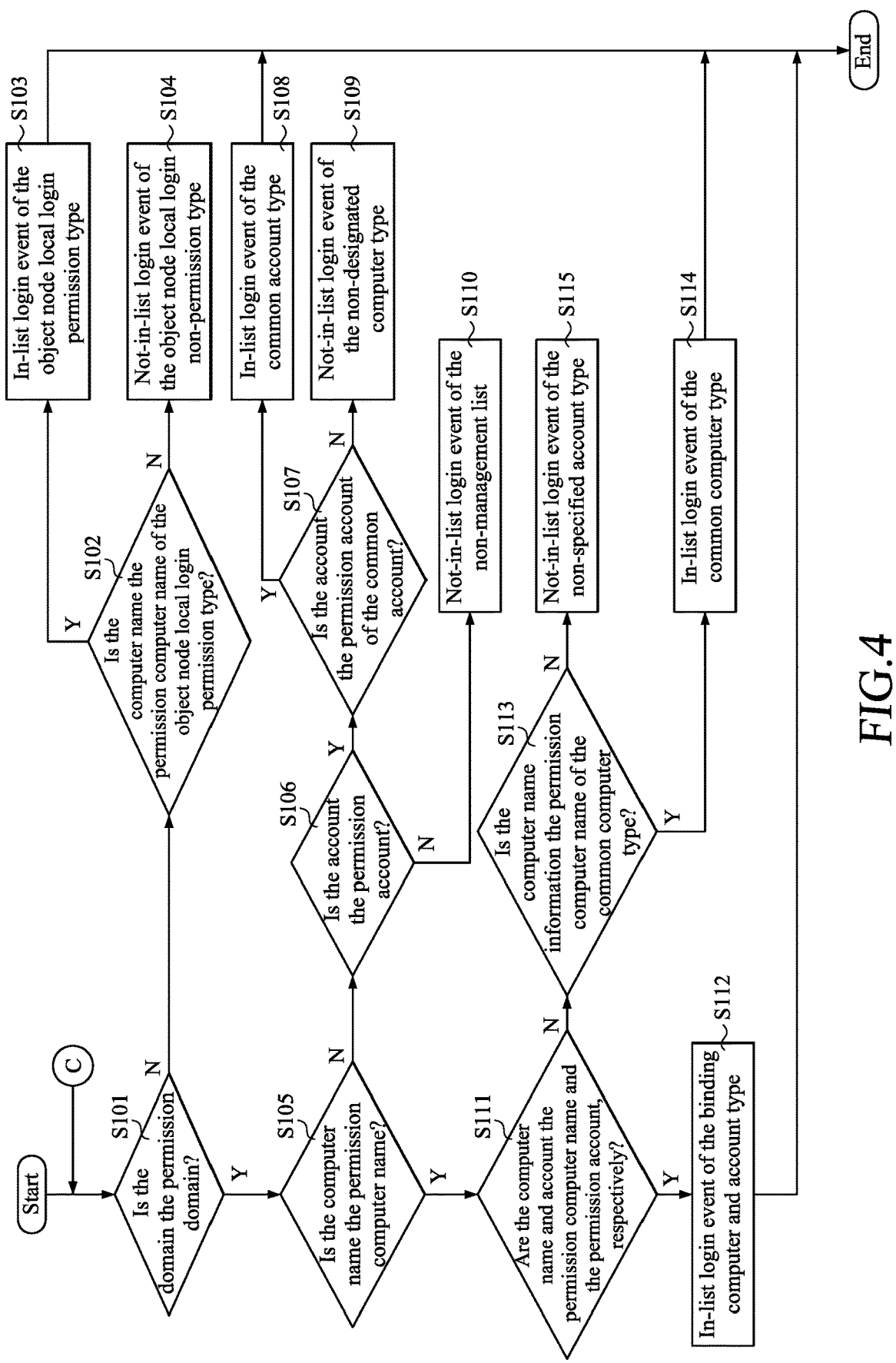
FIG. 4 is a flow chart illustrating the comparing steps of the node login type and the corresponding login event of the node of the network security management system according to the embodiment of the present invention.

The following are the steps of node login type comparison between the node information and the node management list and the corresponding login event of the node login as shown in FIG. 4.

A permission domain information comparison step S101 is performed to compare and determine whether the domain of the node information is the permission domain.

When the result of the permission domain information comparison step S101 is not found matched, the permission computer name information of a object node local login permission type comparison step S102 is performed to compare and determine whether the computer name of the node information is the permission computer name of the object node local login permission type.

When the result of the permission computer name information comparison step for the object node local login permission type S102 is found matched, a in-list type determination step S103 is performed to determine the object node (A1, A2, A3, B1, B2, B3) as performing login with a node type belonging to the object node local login permission type in the node management list, and determine the login of the object node as an in-list login event of the object node local login permission type.

When the result of the permission computer name information comparison step for the object node local login permission type S102 is not found matched, a not-in-list type determination step S104 is performed to determine the object node (A1, A2, A3, B1, B2, B3) as performing login with a node type belonging to the object node local login non-permission type which is not in the node management list, and determine the login of the object node as a not-in-list login event of the object node local login non-permission type.

When the result of the permission domain information comparison step S101 is found matched, a permission computer name information comparison step S105 is performed to compare and determine whether the computer name of the node information is the permission computer name.

When the result of the permission computer name information comparison step S105 is not found matched, a permission account information comparison step S106 is performed to compare and determine whether the account of the node information is the permission account;

When the result of the permission account information comparison step S106 is found matched, a permission account information comparison step for the common account S107 is further performed to compare and determine whether the account of the node information is the permission account of the common account.

When the result of the permission account information comparison step for the common account S107 is found matched, an in-list type determination step S108 is performed to determine the object node (A1, A2, A3, B1, B2, B3) as performing login with a node type belonging to the common account type in the node management list, and determine the login of the object node as an in-list login event of the common account type.

When the result of the permission account information comparison step for the common account S107 is not found matched, a not-in-list type determination step S109 is performed to determine the object node (A1, A2, A3, B1, B2, B3) as performing login with a node type belonging to a non-specified computer type which is not in the node management list, and determine the login of the object node as a not-in-list login event of the non-designated computer type.

When the result of the permission computer name information comparison step S105 is not found matched, and the result of the permission account information comparison step S106 is not found matched, a not-in-list type determination step S110 is performed to determine the object node (A1, A2, A3, B1, B2, B3) as performing login with a node type belonging to a non-management list which is not in the node management list, and determine the login of the object node as a not-in-list login event of the non-management list.

When the result of the permission computer name information comparison step S105 is found matched, the permission account information comparison step for a binding computer and account type S111 is performed to compare and determine whether the account of the node information is the permission account of the binding computer and account type.

When the permission account information comparison step for the binding computer and account type S111 is found matched, an in-list type determination step S112 is performed to determine the object node (A1, A2, A3, B1, B2, B3) as performing login with a node type belonging to the binding computer and account type in the node management list, and determine the login of the object node as an in-list login event of the binding computer and account type.

When the permission account information comparison step for the binding computer and account type S111 is not found matched, the permission computer name information comparison step for a common computer type S113 is further performed to compare and determine whether the computer name information of the node information is the permission computer name of the common computer type.

When the permission computer name information comparison step for the common computer type S113 is found matched, an in-list type determination step S114 is performed to determine the object node (A1, A2, A3, B1, B2, B3) as performing login with a node type belonging to the common computer type in the node management list, and determine the login of the object node as an in-list login event of the common computer type.

When the permission computer name information comparison step for the common computer type S113 is not found matched, a not-in-list type determination step S115 is performed to determine the object node (A1, A2, A3, B1, B2, B3) as performing login with a node type belonging to a non-specified account type which is not in the node management list, and determine the login of the object node as a not-in-list login event of the non-specified account type.

By means of the steps mentioned above, the event management device 3 can allow the object node to log in to the management system based on the in-list login event of the object node and give to the object node the privilege based on the node type, and deny the object node to log in to the management system based on the not-in-list login event of the object node, so as to perform hierarchical management of privilege, thereby ensuring the security of network.

As shown in FIG. 1 and FIG. 2, the network security management system 10 further includes an on-line monitoring device 4. The on-line monitoring device 4 is in signal connection with the event management device 3. The on-line monitoring device 4 is configured to monitor an object node (A1, A2, A3, B1, B2, B3) which has been previously determined as not being in the list and which is found on-lined in the intranet. Moreover, the on-line monitoring device 4 generates a corresponding event in the event management device 3 through a determination step of not-in-list login system event such that the event management device 3 can give to the object node the privilege based on the event and detect whether it is in anomalous state.

For example, the on-line monitoring device 4 detects that the not-in-list object node (A1, A2, A3, B1, B2, B3) is found on-lined in the intranet by having previously determined the object node as not being in the list according to a not-in-list equipment management list. The not-in-list equipment management list is synchronously established in the event management device 3 under the condition that the type determining device 2 determines that the object node is not in the list, and the node information of the not-in-list object node is saved in the node management list.

Figure 5:
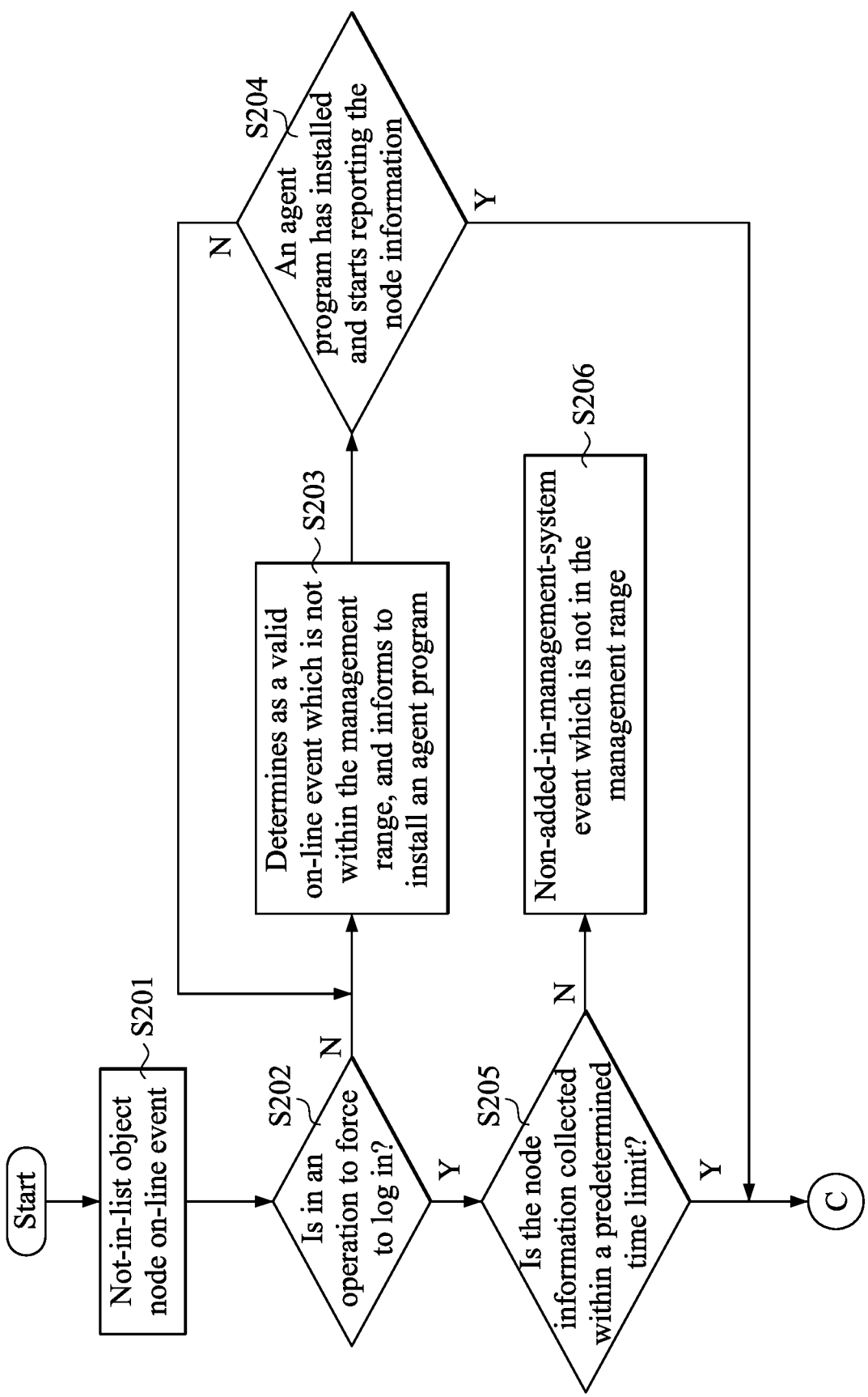
FIG. 5 is a flow chart illustrating the determination steps of a not-in-list login system event of the network security management system according to the embodiment of the present invention.

The following are the determination steps of a not-in-list login system event as shown in FIG. 5:

When the object node (A1, A2, A3, B1, B2, B3) is found on-lined in the intranet in a determination step S201, a determination step S202 is performed to determine whether the object node (A1, A2, A3, B1, B2, B3) is being in an operation to force to log in to the network security management system.

When the determined result of the determination step S202 is not determined as being in an operation to force to log in to the network security management system, a determination step S203 is performed to determine that the object node (A1, A2, A3, B1, B2, B3) is a valid on-line event which is not within the management range (devices such as printer and fax machine are not required to log in to the system), and informs the object node (A1, A2, A3, B1, B2, B3) to perform a management operation of installing agent program. And then a determination step S204 is performed to determine whether the object node (A1, A2, A3, B1, B2, B3) has had an installed agent program and reports the node information such that when the object node (A1, A2, A3, B1, B2, B3) is determined as having had an installed an agent program, the management is performed by being followed by the c in FIG. 4; when the object node (A1, A2, A3, B1, B2, B3) is determined as having not had an installed agent program, the determination step S203 is performed again.

When the determined result of the determination step S202 is determined as being in an operation to force to log in to the network security management system, a determination step S205 is further performed to confirm whether the node information of the object node (A1, A2, A3, B1, B2, B3) is collected by the information collection device 1 within a predetermined time limit such that when the determined result of the determination step S205 is not determined that the node information of the object node (A1, A2, A3, B1, B2, B3) is collected by the information collection device 1 within a predetermined time limit, the object node (A1, A2, A3, B1, B2, B3) is determined as an non-added-in-management-system event which is not in the management range S206.

As shown in FIG. 1 and FIG. 2, the network security management system 100 further includes a periodically confirming device 5. The periodically confirming device 5 is in signal connection with the event management device 3. The periodically confirming device 5 is configured to perform monitoring to periodically confirm the stability of connection through a determination step of connection state event after the in-list object node (A1, A2, A3, B1, B2, B3) log in to the system. Moreover, after the anomalous state has happened, the periodically confirming device 5 generates a corresponding event to the event management device 3 such that the event management device 3 can give to the object node the privilege according to the event and aware the anomalous state. The event management device 3 further includes a periodically reporting event management module 31 which is configured, when the periodically confirming device 5 has confirmed that the object node (A1, A2, A3, B1, B2, B3) being failed to periodically report the node message, to determine the event as a computer non-response event which is not in the management range.

Figure 6:
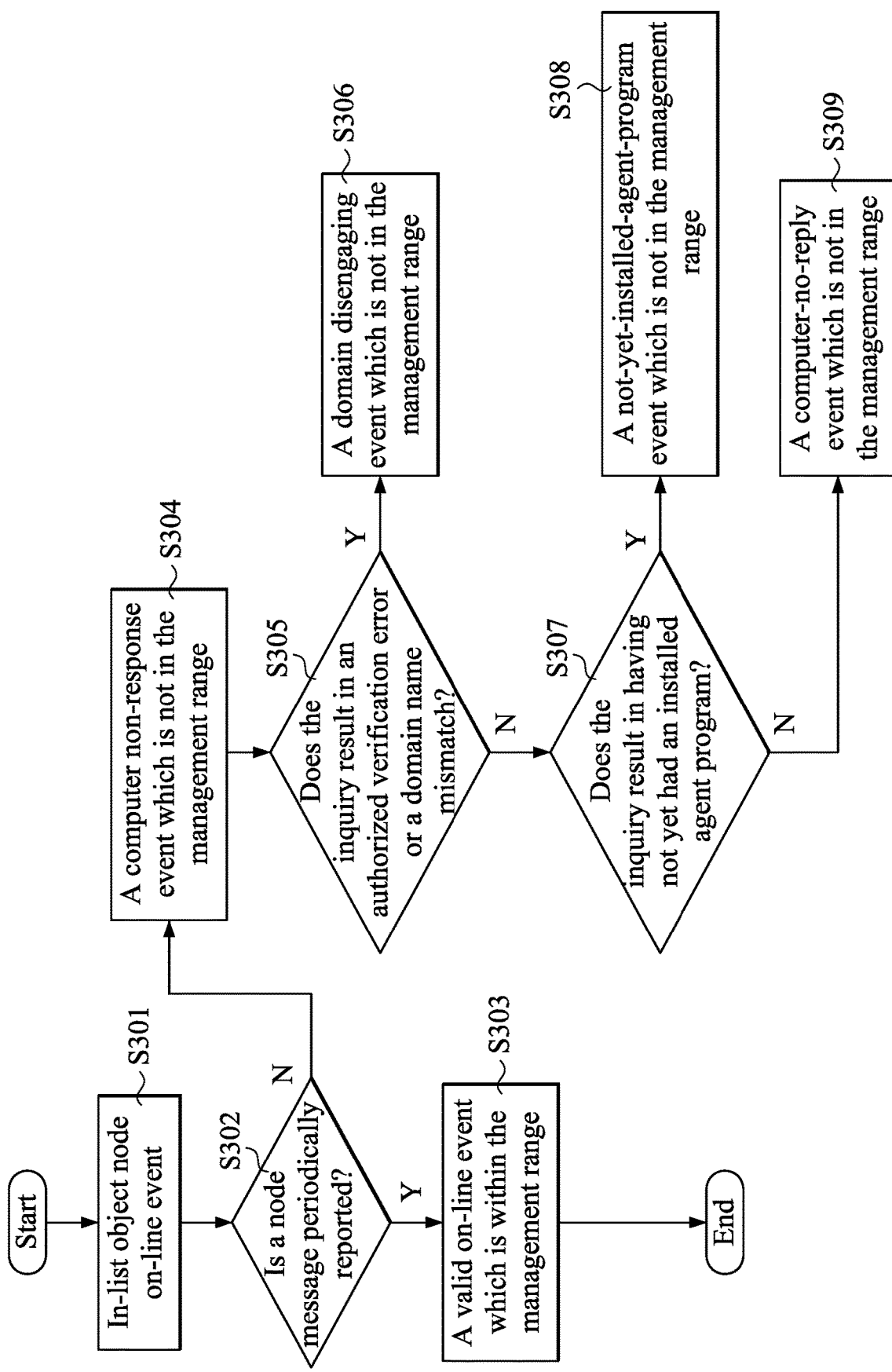
FIG. 6 is a flow chart illustrating the determination steps of a connection state event of an in-list object node of the network security management system according to the embodiment of the present invention.

The following are the determination steps of a connection state event as shown in FIG. 6:

A determination step S301 determines whether the object node (A1, A2, A3, B1, B2, B3) is on-lined such that when the object node (A1, A2, A3, B1, B2, B3) is determined on-lined, a determination step S302 is further performed to confirm whether a node message is periodically reported. When the periodically confirming device 5 determines that the object node periodically reports the node message, the periodically reporting event management module 31 determines that the object node is "a valid on-line event which is within the management range S303". On the contrary, when the periodically confirming device 5 determines that the object node fails to periodically report the node message, the periodically reporting event management module 31 determines that the object node is "a computer non-response event which is not in the management range S304".

The periodically reporting event management module 31 is configured to perform a determination step of Windows management regulation (WMI, Windows Management Instrumentation) inquiry S305 to the object node (A1, A2, A3, B1, B2, B3) when a computer non-response event is determined. When the result of the determination step S305 is an authorized verification error or a domain name mismatch, a determination step S306 is further performed to determine the connection of the object node as a domain disengaging event which is not in the management range.

When the result of the determination step S305 is not an authorized verification error or a domain name mismatch, the periodically reporting event management module 31 further performs a determination step of management regulation inquiry S307 to determine whether the object node (A1, A2, A3, B1, B2, B3) has not yet had an installed agent program such that when the determination step S307 is determined as having not yet had the installed agent program, a determination step S308 is performed to determine the connection of the object node as a not-yet-installed-agent-program event which is not in the management range, while when the determination step S307 is determined as having had the installed agent program, a determination step S309 is performed to determine the connection of the object node as a computer-no-reply event which is not in the management range.

As shown in FIG. 1 and FIG. 2, the network security management system 100 further includes a computer identifying device 6. The computer identifying device 6 is in signal connection with the event management device 3. When the hardware equipment of the object node (A1, A2, A3, B1, B2, B3) is found different from that of the previous time, the computer identifying device 6 generates a message of anomalous computer fake event to be sent to the event management device 3 such that the event management device 3 can give to the object node the privilege according to the event and aware the anomalous computer fake state. The computer identifying device 6 is configured to obtain universally unique identifier data (UUID) of the hardware equipment of the in-list object node, wherein the universally unique identifier data of the hardware equipment of the object node is obtained by the computer identifying device 6 through a management regulation inquiry. Furthermore, the computer identifying device 6 save computer identifying information on a basis of the universally unique identifier data thereby comparing the computer identifying information with the previously saved computer identifying information such that when the compared result is found unmatched, the event management device 3 determines the event as an anomalous computer fake event.

Figure 7:
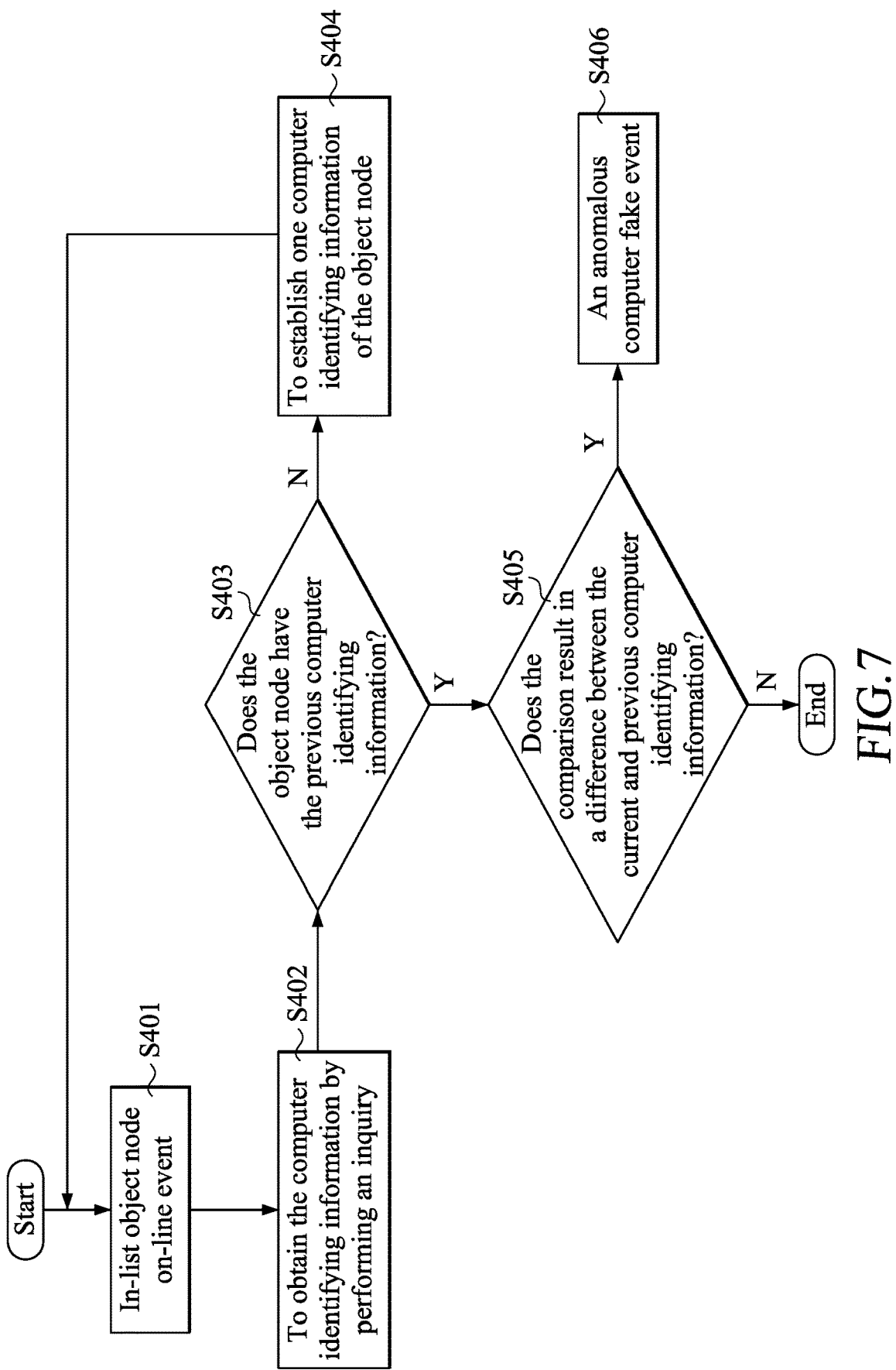
FIG. 7 is a flow chart illustrating the determination steps of a hardware equipment event of an in-list object node of the network security management system according to the embodiment of the present invention.

The following are the determination steps of the hardware equipment event of the computer identifying device 6 as shown in FIG. 7:

In a determination step S401, the computer identifying device 6 determines whether the object node (A1, A2, A3, B1, B2, B3) is found on-lined. Next, the computer identifying device 6 performs an inquiry step S402 to obtain the computer identifying information of the object node. Furthermore, the computer identifying device 6 performs a determination step S403 using the computer identifying information of the current object node so as to determine whether the current object node has the computer identifying information of the previously on-lined object node.

When the result of the determination step S403 is not determined that the current object node has the computer identifying information of the previously on-lined object node, the computer identifying device 6 performs an access step S404 to establish the computer identifying information of the current object node.

When the result of the determination step S403 is determined that the current object node has the computer identifying information of the previously on-lined object node, the computer identifying device 6 performs a comparison step S405 to compare whether it is different between the computer identifying information of the currently on-lined object node and the computer identifying information of the previously on-lined object node. When the result of the comparison step S405 is not found matched, the determined result of the computer identifying device 6 is normal. When the result of the comparison step S405 is found matched, the computer identifying device 6 performs a determination step S406 to determine the on-line event of the hardware equipment of the current object node (A1, A2, A3, B1, B2, B3) as an anomalous computer fake event.

The above description should be considered only as an explanation of the preferred embodiment of the present invention. A person with ordinary skill in the art can make various modifications to the present invention based on the scope of the claims and the above description. However, those modifications shall fall within the scope of the present invention.

What is claimed is:

1. A network security management system which manages an object node belonging to an intranet, the network security management system comprising:
    an information collecting device configured to collect node information of each object node which is transmitted when each object node performs a login operation, the node information including domain information, computer name information and account information;
    a type determining device which is in signal connection with the information collecting device, the type determining device being configured to perform a comparison between the node information received by the information collection device and a node management list to determine a node type belonging to each object node that performs the login operation in the network security management system, wherein the node management list is with permission domain information, permission computer name information and permission account information respectively corresponding to each node type, and the comparison between the node information and the node management list is performed by respectively comparing the node information to the permission domain information, the node information to the permission computer name information and the node information to the permission account information to obtain a compared result so as to determine the node type of the object node as the node type of the object node is found in the node management list, or to determine the object node of the object is not in the node management list as the object node is not found with any corresponding node type in the node management list;
    an event management device which is in signal connection with the type determining device, the event management device being configured to determine a login event of the object node based on the compared result from the type determining device so as to perform a corresponding management operation to the object node, wherein the management operation includes an operation to decide whether the object node has an operating privilege, or to give to the object node the operating privilege corresponding to the node type of the object node; and
    a computer identifying device which is in signal connection with the event management device, the computer identifying device being configured to:
        inquiry the object node in the node management list by a management regulation to obtain a universally unique identifier data of the object node;
        save a computer identifying information on a basis of the universally unique identifier data; and
        compare the computer identifying information with a previously saved computer identifying information to determine whether the computer identifying information matches the previously saved computer identifying information;
    wherein, in response to the computer identifying information not matching the previously saved computer identifying information, the event management device:
        determines that a computer hardware associated with the object node has been changed manually;
        determines the event as an anomalous computer fake event; and
        informs that real-time supervision should be performed.

2. The network security management system of claim 1, the node type including an object node local login permission type whose corresponding permission domain information and the corresponding permission account information are recorded as a null information, wherein the type determining device performs a comparison regarding the permission domain information and then performs a comparison regarding the permission computer name information of the object node local login permission type when the comparison regarding the permission domain information is not found matched such that when the comparison regarding the permission computer name information of the object node local login permission type is found matched, the object node is determined as performing login with a node type belonging to the object node local login permission type in the node management list, and accordingly the event management device determines the login of the object node as an in-list login event of the object node local login permission type.

3. The network security management system of claim 2, wherein when the comparison regarding the permission computer name information of the object node local login permission type is not found matched, the object node is determined as performing login with a node type belonging to the object node local login non-permission type which is not in the node management list, and accordingly the event management device determines the login of the object node as a not-in-list login event of the object node local login non-permission type.

4. The network security management system of claim 1, the node type including a common account type whose corresponding permission computer name information is recorded as null information, wherein the type determining device performs a comparison respectively regarding the permission domain information, the permission computer name information and the permission account information and then further performs a comparison regarding the permission account information of the common account type when the comparison regarding the permission domain information is found matched, the comparison regarding the permission computer name information is found unmatched, and the comparison regarding the permission account information is found matched such that when the comparison regarding the permission account information of the common account type is found matched, the object node is determined as performing login with a node type belonging to the common account type in the node management list, and accordingly the event management device determines the login of the object node as an in-list login event of the common account type.

5. The network security management system of claim 4, wherein when the comparison regarding the permission domain information is found matched, the comparison regarding the permission computer name information is not found matched and the comparison regarding the permission account information is not found matched, the object node is determined as performing login with a node type belonging to a non-management list which is not in the node management list, and accordingly the event management device determines the login of the object node as a not-in-list login event of the non-management list.

6. The network security management system of claim 4, wherein when the comparison regarding the permission account information of the common account type is not found matched, the object node is determined as performing login with a node type belonging to a non-specified computer type which is not in the node management list, and accordingly the event management device determines the login of the object node as a not-in-list login event of the non-designated computer type.

7. The network security management system of claim 1, the node type including a binding computer and account type, wherein the type determining device performs a comparison respectively regarding the permission domain information and the permission computer name information and then performs a comparison regarding the permission account information of the binding computer and account type when the comparison regarding the permission domain information is found matched and the comparison regarding the permission computer name information is found matched such that when the comparison regarding the permission account information of the binding computer and account type is found matched, the object node is determined as performing login with a node type belonging to the binding computer and account type in the node management list, and accordingly the event management device determines the login of the object node as an in-list login event of the binding computer and account type.

8. The network security management system of claim 7, the node type including a common computer type whose corresponding permission account information is recorded as a null information, wherein the type determining device further performs a comparison regarding the permission computer name information of the common computer type when the comparison regarding the permission account information of the binding computer and account type is not found matched such that when the comparison regarding the permission computer name information of the common computer type is found matched, the object node is determined as performing login with a node type belonging to the common computer type in the node management list, and accordingly the event management device determines the login of the object node as an in-list login event of the common computer type.

9. The network security management system of claim 8, wherein when the comparison regarding the permission computer name information of the common computer type is not found matched, the object node is determined as performing login with a node type belonging to a non-specified account type which is not in the node management list, and accordingly the event management device determines the login of the object node as a not-in-list login event of the non-specified account type.

10. The network security management system of claim 1, further comprising an on-line monitoring device which is in signal connection with the event management device, the on-line monitoring device being configured to determine whether an object node which has been previously determined as not being in the list and which is found on-lined in the intranet is being in an operation to force to log in to the network security management system, and when the object node is determined as not being in an operation to force to log in to the network security management system, the event management device determines that the object node is a valid on-line event which is not within the management range, and informs the object node to perform a management operation of installing agent program.

11. The network security management system of claim 10, wherein when the object node is determined as being in an operation to force to log in to the network security management system the on-line monitoring device is configured to further confirm whether the node information of the object node is collected by the information collection device within a predetermined time limit such that when the object node is determined as being in an operation not to force to log in to the network security management system, the event management device determines that the object node is an non-added-in-management-system event which is not in the management range.

12. The network security management system of claim 1, further comprising a periodically confirming device which is in signal connection with the event management device, the periodically confirming device being configured to confirm whether the object node in the list has periodically reported a node message, and the event management device further includes a periodically reporting event management module which is configured, when the periodically confirming device has confirmed that the object node being failed to periodically report the node message, to determine the event as a computer non-response event which is not in the management range.

13. The network security management system of claim 12, wherein the periodically reporting event management module is configured, when a computer non-response event is determined, to perform a management regulation inquiry on the object node, and further determine, when the result of the management regulation inquiry is an authorized verification error or a domain name mismatch, the event as a domain disengaging event which is not in the management range.

14. The network security management system of claim 13, wherein when the result of the management regulation inquiry is not an authorized verification error or a domain name mismatch, the periodically reporting event management module further performs a management regulation inquiry to determine whether the object node has not yet installed an agent program such that when the object node is determined as not yet installed the agent program, the event is determined as a not-yet-installed-agent-program event which is not in the management range, while when the object node is determined as having been installed the agent program, the event is determined as a computer-no-reply event which is not in the management range.

* * * * *